Patented Jan. 9, 1923.

1,441,989

BEST AVAILABLE COPY

UNITED STATES PATENT OFFICE.

LEON LILIENFELD, OF VIENNA, AUSTRIA.

PRODUCTION OF CELLULOSE ETHERS.

No Drawing. Application filed April 25, 1921. Serial No. 464,355.

*To all whom it may concern:*

Be it known that I, LEON LILIENFELD, of Podhajce, Poland, a citizen of Poland, residing at 1 Zeltgasse, Vienna VIII, Austria, have invented certain new and useful Improvements in and Relating to the Production of Cellulose Ethers, of which the following is a specification.

The production of ethers of cellulose, its conversion products and derivatives has hitherto been effected in so far as alkali cellulose was taken as a starting material, by first forming alkali cellulose and treating the alkali cellulose with alkylating, aralkylating or arylating agents.

This method of preparation was inconvenient and time-consuming in so far as in the treatment of the cellulose with caustic alkali solutions, the removal of the excess alkali by pressing, centrifuging or the like was carried out and a ripening process of many days' duration was necessary.

I have now found that for the preparation of ethers of cellulose neither the removal of the excess of caustic alkali nor the process of ripening (ageing) for several days is necessary and that it suffices to treat the cellulose or its conversion products or derivatives impregnated with caustic alkali solution, (without removing the excess of caustic alkali solutions and without subjecting it to a ripening treatment,) with the alkylating, aralkylating or arylating agents in the known manner in order to obtain useful cellulose ethers.

I claim:

1. A process of preparing ethers of cellulosic substances which comprises impregnating said material with caustic alkali solution and then treating with an alkylating agent without removing the excess of caustic alkali solution and without subjecting the impregnated material to a ripening treatment, substantially as described.

2. A process of forming ethers of cellulosic substances which comprises impregnating such material with caustic alkali solution, and then at once treating the entire mixture with an etherifying agent.

3. A process of preparing ethers of cellulosic substances which comprises impregnating said material with caustic alkali solution and then treating with an etherifying agent without removing the excess of caustic alkali solution and without subjecting the impregnated material to a ripening treatment, substantially as described.

In testimony whereof I have signed my name to this specification.

DR. LEON LILIENFELD.